United States Patent
Maltsev et al.

(10) Patent No.: US 7,286,606 B2
(45) Date of Patent: Oct. 23, 2007

(54) SYSTEM AND METHOD FOR CHANNELIZATION RECOGNITION IN A WIDEBAND COMMUNICATION SYSTEM

(75) Inventors: Alexander A. Maltsev, Nizhny Novgorod (RU); Ali S. Sadri, San Diego, CA (US); Andrey V. Pudeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 10/728,476

(22) Filed: Dec. 4, 2003

(65) Prior Publication Data

US 2005/0123060 A1    Jun. 9, 2005

(51) Int. Cl.
*H04K 1/00* (2006.01)
(52) U.S. Cl. ...................................... 375/260
(58) Field of Classification Search ................ 375/260, 375/346, 347, 349, 299, 148
See application file for complete search history.

(56) References Cited

U.S. PATENT DOCUMENTS

| | | | |
|---|---|---|---|
| 6,654,408 B1* | 11/2003 | Kadous et al. | 375/148 |
| 2003/0058951 A1* | 3/2003 | Thompson et al. | 375/260 |
| 2003/0076777 A1* | 4/2003 | Stuber et al. | 370/206 |
| 2004/0202138 A1* | 10/2004 | Song et al. | 370/335 |
| 2005/0002326 A1* | 1/2005 | Ling et al. | 370/208 |
| 2005/0078707 A1 | 4/2005 | Maltsev et al. | |
| 2006/0274844 A1* | 12/2006 | Walton et al. | 375/260 |

FOREIGN PATENT DOCUMENTS

| | | |
|---|---|---|
| WO | WO-01/99362 A2 | 12/2001 |
| WO | WO-03/061204 A1 | 7/2003 |
| WO | WO-2005/004500 A2 | 1/2005 |
| WO | WO-2005/034435 A2 | 4/2005 |

OTHER PUBLICATIONS

Bangerter, Boyd, "High-Throughput Wireless LAN Air Interface", *Intel Technology Journal: Wireless Technologies*, 7(3), Available at http://developer.intel.com/technology/itj/index.htm, (Aug. 19, 2003), 47-57.

(Continued)

*Primary Examiner*—Emmanuel Bayard
(74) *Attorney, Agent, or Firm*—Schwegman, Lundberg & Woessner, P.A.

(57) ABSTRACT

The channelization of a WB OFDM channel may be determined by detecting a plurality of subchannels and generate a channelization vector indicating which of the subchannels are active and which of the subchannels are inactive. In response to the channelization vector, data-symbol processing may be performed on the active subchannels and may be refrained from being performed on the inactive subchannels. In some embodiments, a decoded bit stream may be generated from the combined contributions of the active channels. In some embodiments, the subchannels may be detected with a parallel set of matched filters. The matched filters may have a coefficient spectrum matched to a corresponding one of the subchannels.

29 Claims, 8 Drawing Sheets

OTHER PUBLICATIONS

Khun-Jush, Jamshid, et al., "Structure and performance of the HIPERLAN/2 physical layer", *VTC 1999—Fall. IEEE VTS 50th Vehicular Technology Conference*, vol. 5, (Sep. 19-27,), 2667-2671.

"802.11g™ IEEE Local and Metropolitan Area Networks; Part 11: Wireless LAN Medium Accesss Control (MAC) and Physical Layer (PHY) specifications; Amendment 4:Further Higher Data Rate extension in the 2.4 GHz Band", *IEEE STD 802.11G*, The Institute of Electrical and Electronics Engineers, Inc. NY,(Jun. 27, 2003), 78 pgs.

"International Search Report for corresponding PCT Application No. PCT/US2004/038736", ,(Apr. 19, 2005), 4 pgs.

"Supplement to IEEE Standard for IT-Telecomm. & Info. Exchange Between Systems—Local and Metropolitan Area Networks—specific requirements. Part 11:Wireless LAN Medium Access Control(MAC)and Physical Layer(PHY)Specs:High-speed Physical Layer in 5GHZ Band", *IEEE Std 802.11a-1999*, (Dec. 30, 1999), 1-90.

Motegi, M., et al., "Optimum Modulation Assignment According to Subband Channel Status for BST-OFDM", *IEICE Transactions on Fundamentals of Electronics, Communications and Computer Sciences, Institute of Electronic Sciences, Institute of Electronics Information and Communications Eng.*, vol. E84-A (7), (Jul. 1, 2001), 1714-1722.

Zhen, L., et al., "A Modified Sub-Optimum Adaptive Bit and Power Allocation Algorithm in Wideband OFDM System", *CCECE 2003 Canadian Conference on Electrical and Computer Engineering*, vol. 3 of 3, 2003 IEEE, (May 4, 2003), 1589-1592.

\* cited by examiner

SYSTEM AND METHOD FOR CHANNELIZATION RECOGNITION IN A WIDEBAND COMMUNICATION SYSTEM

TECHNICAL FIELD

The present invention pertains to wireless communications. Some embodiments of the present invention pertain to wireless local-area networks (WLANs) and high-throughput (HT) orthogonal frequency-division multiplexed (OFDM) communications.

BACKGROUND

Orthogonal frequency-division multiplexing (OFDM) is an example of a multi-carrier transmission technique that uses symbol-modulated orthogonal subcarriers to transmit information within an available spectrum. Many modern digital communication systems, including wireless local-area networks (WLANs), are using symbol-modulated orthogonal subcarriers as a modulation scheme to help signals survive in environments having multipath reflections and/or strong interference. One problem with many conventional systems that use symbol-modulated subcarriers is that channel bandwidth is limited to the bandwidth of the individual channels. Some conventional wireless communication systems, such as WLANs that implement OFDM communications, communicate using channels that may only have about a 20 MHz bandwidth. Thus, there are general needs for systems and methods for wider bandwidth communications.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
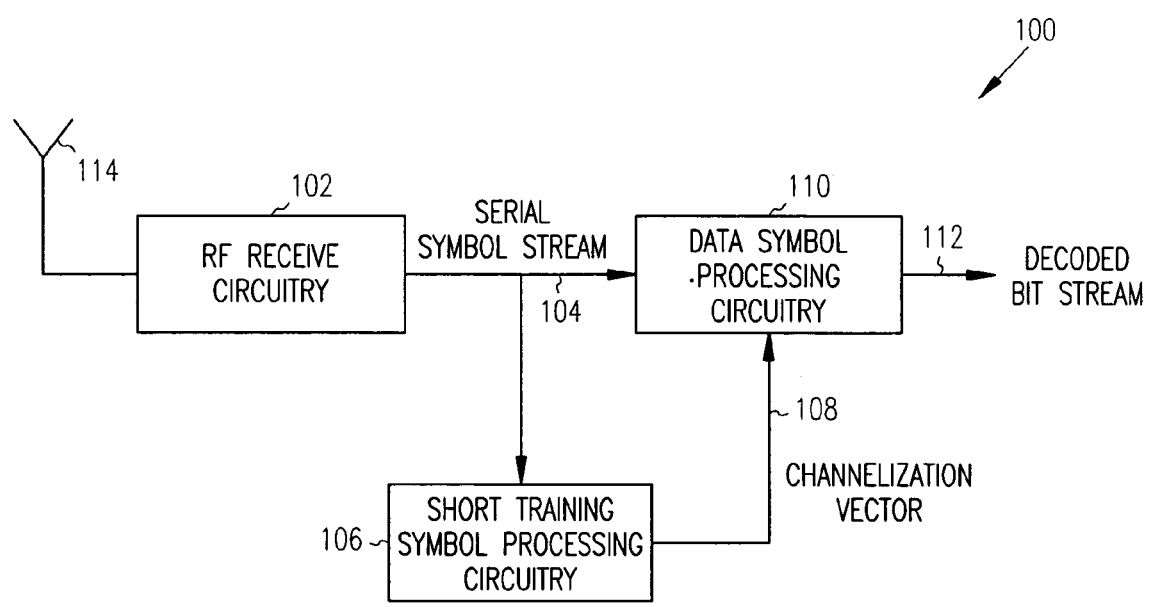
FIG. 1 is a block diagram of a wideband receiver system in accordance with some embodiments of the present invention.

FIG. 1 is a block diagram of a wideband receiver system in accordance with some embodiments of the present invention. Receiver system 100 may comprise radio frequency (RF) receiver circuitry 102 to receive symbol-modulated subcarriers through antenna 114 and to generate serial symbol stream 104. Receiver system 100 may also comprise data-symbol processing circuitry 110 to process serial symbol stream 104 and generate decoded bit stream 112. Receiver system 100 may also comprise short-training symbol processing circuitry 106 which may receive serial symbol stream 104 and may generate channelization vector 108 for use by data-symbol processing circuitry 110.

In accordance with some embodiments, short-training symbol processing circuitry 106 may determine the channelization of a wideband channel by detecting a plurality of subchannels and may generate channelization vector 108 indicating which of the subchannels are active and which of the subchannels are inactive. In response to the channelization vector, data-symbol processing circuitry 110 may process symbols from the active subchannels and may refrain from processing the inactive subchannels. Attempting to receive on an inactive channel may result in loss of the entire packet, especially when the inactive channel contains noise and/or interference. In some embodiments, data-symbol processing circuitry 110 may refrain from processing the inactive subchannels by switching-off or turning-off processing for the inactive subchannels.

In some embodiments, decoded bit stream 112 may be generated from the combined contributions of the active channels. In some embodiments, the subchannels may be detected with a parallel set of matched filters. The matched filters may have coefficient spectra matched to corresponding ones of the subchannels. Some of these embodiments are described in more detail below.

In some embodiments, short-training symbol processing circuitry 106 may perform functions such as packet detection and synchronization with symbol boundaries. In some embodiments, short-training symbol processing circuitry 106 may initiate data processing by data-symbol processing circuitry 110, although the scope of the invention is not limited in these respects.

In some embodiments, receiver system 100 may be part of a wireless communication device which receives and/or transmits RF communications with antenna 114. Examples of a wireless communication device may include a personal digital assistant (PDA), a laptop or portable computer with wireless communication capability, a web tablet, a wireless telephone, a wireless headset, a pager, an instant messaging device, an MP3 player, a digital camera, an access point or other device that may receive and/or transmit information wirelessly. In some embodiments, receiver system 100 may receive RF communications in accordance with specific communication standards, such as the IEEE 802.11(a), 802.11(b), 802.11(g) and/or 802.16 standards for wireless local-area network communications, including high-throughput (HT) and wideband (WB) standards. In some embodiments, antenna 114 may comprise a directional or omnidirectional antenna, including, for example, a dipole antenna, a monopole antenna, a loop antenna, a microstrip antenna or other type of antenna suitable for reception and/or transmission of RF signals.

Accordingly, receiver system 100 may operate as part of a WB or HT OFDM communication system. In some embodiments, receiver system 100 may provide for recognition of a channelization configuration in WB or HT OFDM systems, including systems with an adaptively-changing frequency bandwidth. In these embodiments, the bandwidth of a communication channel may be increased by combining up to four or more narrowband channels (e.g., subchannels) to form a wideband channel. In some embodiments, the subchannels may have bandwidths of approximately 20 MHz, and the wideband channel may have a bandwidth of up to 80 MHz and greater depending on the number of subchannels utilized.

In some embodiments, a transmitting communication station, (e.g., an HT access point) may dynamically select the wideband channel bandwidth and may avoid subchannels with poor quality or other problems. In these embodiments, a transmitting communication station may employ a parallel multichannel data transmission technique which uses one or more subchannels with synchronized data streams. In these embodiments, each data stream may be preceded by a standard preamble, such as an 802.11a preamble, although the scope of the invention is not limited in this respect. Receiver system 100 may not know in advance which particular subchannels the transmitting station is utilizing for transmitting a wideband packet. Therefore, receiver system 100 may sample the subchannels to generate channelization vector 108 to identify which subchannels are active and which subchannels are inactive.

Although receiver system 100 is illustrated as having several separate functional elements, one or more of the functional elements may be combined and may be implemented by combinations of software-configured elements, such as processing elements including digital signal processors (DSPs), and/or other hardware elements. For example, some of the illustrated elements may comprise one or more microprocessors, DSPs, application specific integrated circuits (ASICs), and combinations of various hardware and logic circuitry for performing at least the functions described herein.

Figure 2:
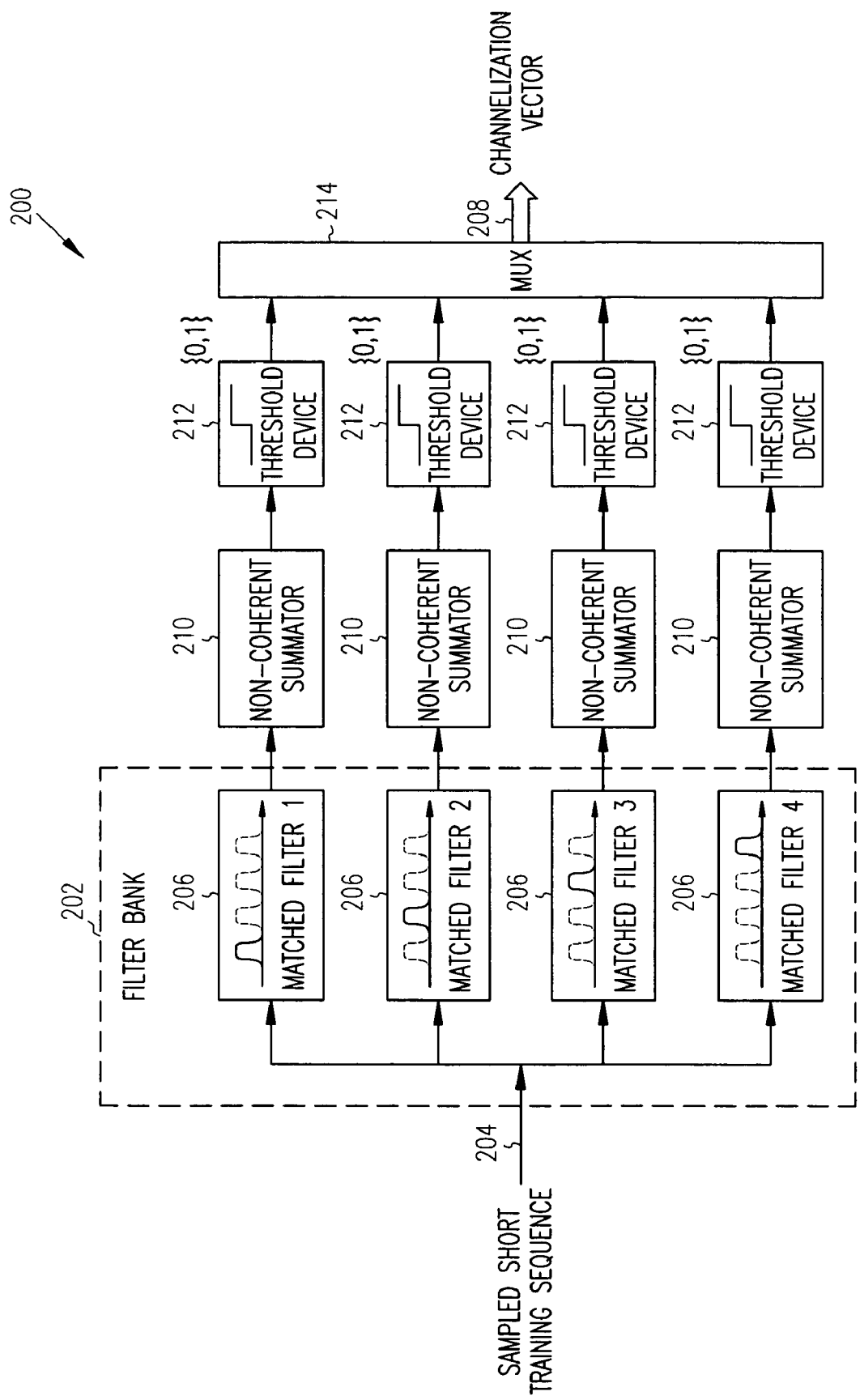
FIG. 2 is a block diagram of a portion of short-training symbol processing circuitry in accordance with some embodiments of the present invention.

FIG. 2 is a block diagram of a portion of short-training symbol processing circuitry in accordance with some embodiments of the present invention. Short-training symbol processing circuitry 200 may be suitable for use as short-training symbol processing circuitry 106 (FIG. 1), although other circuitry may also be suitable. Short-training symbol processing circuitry 200 may detect a training sequence (e.g., serial symbol stream 104 (FIG. 1) comprising a sampled short-training sequence) modulated on one or more subchannels and may generate channelization vector 208 indicating which of the subchannels are active and which of the subchannels are inactive. In some embodiments, short-training symbol processing circuitry 200 may comprise filter bank 202 having a plurality of matched filters 206. Each matched filter 206 may have a coefficient spectrum matched to a corresponding one of the subchannels.

In some embodiments, short-training symbol processing circuitry 200 may further comprise non-coherent summators 210 to sum output from a corresponding one of matched filters 206, and threshold detectors 212 to determine when the summed output from a corresponding one of summators 210 exceeds a predetermined threshold. Non-coherent summators 210 do not preserve the magnitude and phase of the signals in summation. Short-training symbol processing circuitry 200 may further comprise multiplexer 214 to combine outputs from threshold detectors 212 to assemble channelization vector 208. In some embodiments that utilize four subchannels comprising a wideband channel, multiplexer, for example, may assemble a channelization vector, such as "1011", that may indicate that the first, third and fourth subchannels are active and that the second subchannel is inactive.

In some embodiments, the number of matched filters 206, summators 210 and threshold detectors 212 may depend on the number of subchannels that comprise a wideband channel. Although short-training symbol processing circuitry 200 is illustrated with four matched filters 206, four summators 210 and four threshold detectors 212, the scope of the invention is not limited in this respect. In some embodiments, channelization vector 208 may include a "one" or a "zero" for each subchannel of a wideband channel.

In some embodiments, filters 206 may be matched to a short training OFDM symbol, such as the short-training symbols of the 802.11a standard. In these embodiments, each filter 206 may have substantially the same filter coefficients, but their center frequencies may be shifted by the frequency offset between the channels, such as about approximately 20 MHz. Examples of this are further described below.

In some embodiments, non-coherent summators 210 may perform an averaging of the matched-filter response over several of the short-training symbols. This may reduce noise and accumulate energy from subsequent short-training symbols. In some embodiments, threshold detectors 212 may be threshold devices that search for a threshold exceeding a predetermined amount within a predetermined symbol interval. In some embodiments, the beginning of the symbol interval may be determined at a wideband energy-detection instant (e.g., when a wideband packet is initially detected). In some embodiments, detection, automatic gain control (AGC), and coarse frequency estimation may be performed over all available subchannels. The signals from different subchannels man be combined (e.g., optimally weighted) to obtain a single AGC value and a single frequency estimate offset for processing the packet.

In some embodiments, sampled short-training sequence 204 is provided to matched filters 206 after receiver system 100 (FIG. 1) detects a wideband packet and performs a coarse frequency offset correction using the first several of the short-training symbols. In some embodiments, the thresholds for threshold detectors 212 may be calculated from a Neyman-Pearson criterion for a predetermined false-alarm probability, although the scope of the invention is not limited in this respect.

In some embodiments, the generation of channelization vector 208 may also be used for coarse symbol-timing synchronization. In these embodiments, coarse timing synchronization may be performed by matched filtering the last short symbols of the short-training sequence so that the moment threshold devices 212 detect a threshold exceeding a predetermined threshold, the boundary of the training symbols may be determined.

The independent detection of subchannels with non-coherent summators 210 may provide a greater stability to multi-path distortion, especially in a frequency-selective channel. The use of a parallel set of identical or substantially identical matched filters 206 may reduce filter length and reduce complexity compared with conventional maximum-likelihood channel-recognition schemes. Although in some embodiments, matched filters 206 are described as being matched to a sequence of short-training symbols of known values, this is not a requirement. Matched filters 206 may be matched to any predetermined sequence.

Figure 3:
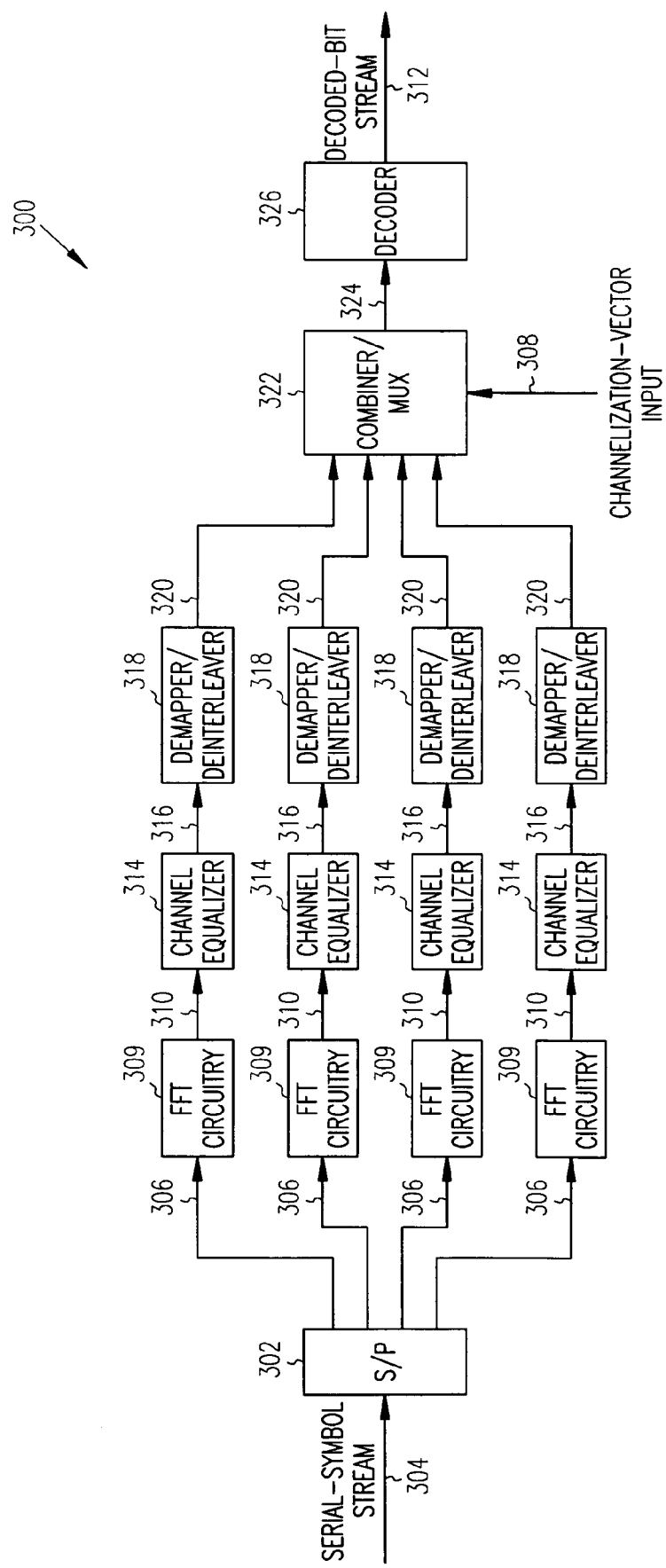
FIG. 3 is block diagram of portions of data-symbol processing circuitry in accordance with some embodiments of the present invention.

FIG. 3 is a block diagram of a portion of data-symbol processing circuitry in accordance with some embodiments of the present invention. Data-symbol processing circuitry 300 may be suitable for use as data-symbol processing circuitry 110 (FIG. 1), although other circuitry may also be suitable. Data-symbol processing circuitry 300 processes serial symbol stream 304 of OFDM symbols to generate a decoded bit stream 312. In accordance with some embodiments, data-symbol processing circuitry 300 may be responsive to channelization vector 308 and may process data symbols on subchannels identified as active subchannels. Accordingly, decoded bit stream 312 may represent data from one or more active subchannels. In some embodiments, data-symbol processing circuitry 300 may actively refrain from processing on subchannels identified as inactive subchannels.

Data-symbol processing circuitry 300 may include serial-to-parallel converter 302 to convert a symbol of serial symbol stream 304 into parallel groups of time-domain samples 306 for fast-Fourier transform (FFT) circuitry 309. FFT circuitry 309 may perform a FFT on the parallel groups of time-domain samples 306 to generate frequency-domain symbol-modulated subcarriers 310. In some embodiments, FFT circuitry 309 may perform an FFT on known training symbols (e.g., long-training symbols) so that a channel estimate may be generated for the subchannel. Channel equalizer 314 may perform channel equalization on frequency-domain symbol-modulated subcarriers 310 and may generate channel-equalized frequency-domain symbol-modulated subcarriers 316. Channel equalizer 314 and may use the channel estimation provided by a channel estimator (not illustrated). In some embodiments, channel equalizer 314 may perform channel equalization in the frequency domain by division of the frequency domain subcarriers 310 with complex values that represent the channel estimation provided by a channel estimator. Accordingly, the magnitudes of equalized frequency-domain symbol-modulated subcarriers 316 may be normalized and the phases of equalized frequency-domain symbol-modulated subcarriers 316 may be aligned to a zero origin to allow for further processing by demapper and deinterleaver circuitry 318.

In some embodiments, equalized frequency-domain symbol-modulated subcarriers 316 may be demodulated by a demodulator (not separately illustrated) to produce a plurality of demodulated parallel symbols. In some embodiments, the demodulator may individually demodulate the individual subcarriers in accordance with a particular modulation order in which the transmitter individually modulated the subcarriers. Modulation orders, for example, may include binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, and 64-QAM, which communicates six bits per symbol. Modulation orders may also include differentially-coded star QAM (DSQAM). Modulation orders with lower and even higher communication rates may also be used by the transmitting station. The parallel symbols from the demodulator may be converted from a parallel form to a serial stream and provided to demapper and deinterleaver circuitry 318.

Demapper and deinterleaver circuitry 318 may demap and deinterleave the demodulated frequency-domain symbol-modulated subcarriers 316 to generate bit stream 320 which may be decoded by decoder 326. Decoder 326 may be a Viterbi decoder, although the scope of the invention is not limited in this respect.

In accordance with some embodiments of the present invention, data-symbol processing circuitry 300 may also include circuitry for processing a predetermined number of subchannels in parallel. Although FIG. 3 illustrates data-symbol processing circuitry 300 with elements for processing four subchannels in parallel, this is not a requirement, and in some embodiments, data-symbol processing circuitry 300 may include elements for processing an even greater number of subchannels. In these embodiments, combiner 322 may combine the bit streams generated from each subchannel and provide combined bit stream 324 to decoder 326.

In some embodiments, when RF-receive circuitry 102 provides separate serial symbol streams 304 for more than one subchannel, data-symbol processing circuitry 300 may include more than one serial-to-parallel converter 302. In accordance with some embodiments, data-symbol processing circuitry 300 may comprise four 64 bit FFT circuits arranged in parallel corresponding to FFT circuitry 309 for processing each of a predetermined number of subchannels substantially in parallel, although the scope of the invention is not limited in this respect.

Figure 4:
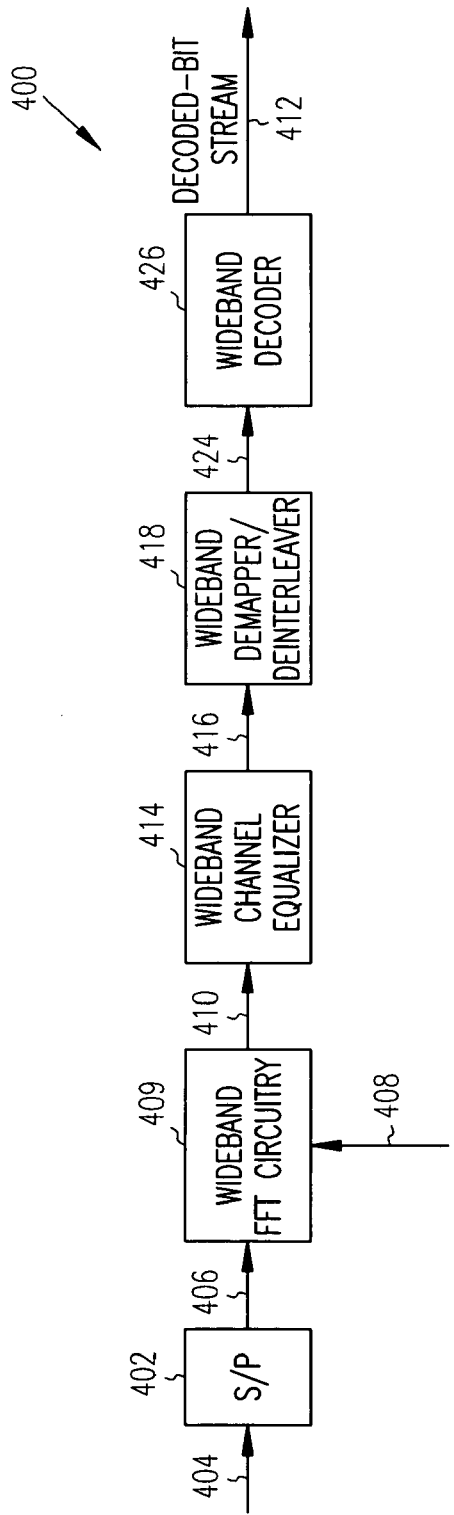
FIG. 4 is block diagram of portions of data-symbol processing circuitry in accordance with other embodiments of the present invention.

FIG. 4 is a block diagram of a portion of data-symbol processing circuitry in accordance with other embodiments of the present invention. Data-symbol processing circuitry 400 may be suitable for use as data-symbol processing circuitry 110 (FIG. 1), although other circuitry may also be suitable. Data-symbol processing circuitry 400 processes serial symbol stream 404 of OFDM symbols to generate decoded bit stream 412. In accordance with some embodiments, data-symbol processing circuitry 400 may be responsive to channelization vector 408 and may process data symbols on subchannels identified as active subchannels. Accordingly, decoded bit stream 412 may represent data from one or more active subchannels. In some embodiments, data-symbol processing circuitry 400 may actively refrain from processing on subchannels identified as inactive subchannels.

Data-symbol processing circuitry 400 may include serial-to-parallel converter 402 to convert a symbol of serial symbol stream 404 into parallel groups of time-domain samples 406 for wideband fast-Fourier transform (FFT) circuitry 409. Time-domain samples 406 may comprise time-domain samples from a wideband channel. Wideband FFT circuitry 409 may perform a FFT on the parallel groups of time-domain samples 406 to generate frequency-domain symbol-modulated subcarriers 410. Wideband channel equalizer 414 may perform channel equalization on frequency-domain symbol-modulated subcarriers 410 for each of the subchannels and may generate channel-equalized frequency-domain symbol-modulated subcarriers 416.

After demodulation, wideband demapper and deinterleaver circuitry 418 may demap and/or deinterleave the demodulated frequency-domain symbol-modulated subcarriers to generate bit stream 420 which may be decoded by wideband decoder 426. Bit stream 420 may be comprised of bit-stream contributions from the active subchannels that may comprise a packet, such as an OFDM packet. Decoder 426 may be Viterbi decoder, although the scope of the invention is not limited in this respect.

In some embodiments, wideband FFT circuitry 409 may be a 256-bit FFT circuit configured to perform an FFT on parallel groups of time-domain samples from four subchannels, although the scope of the invention is not limited in this respect. In these embodiments, wideband FFT circuitry 409 may be responsive to channelization vector 408 to perform an FFT on the parallel groups of time-domain samples from the active subchannels, and refrain from performing an FFT on the inactive channels. Although wideband FFT circuitry 409 is illustrated as being responsive to channelization vector 408, other elements of data-symbol processing circuitry 400 may also be responsive to channelization vector 408.

Figure 5:
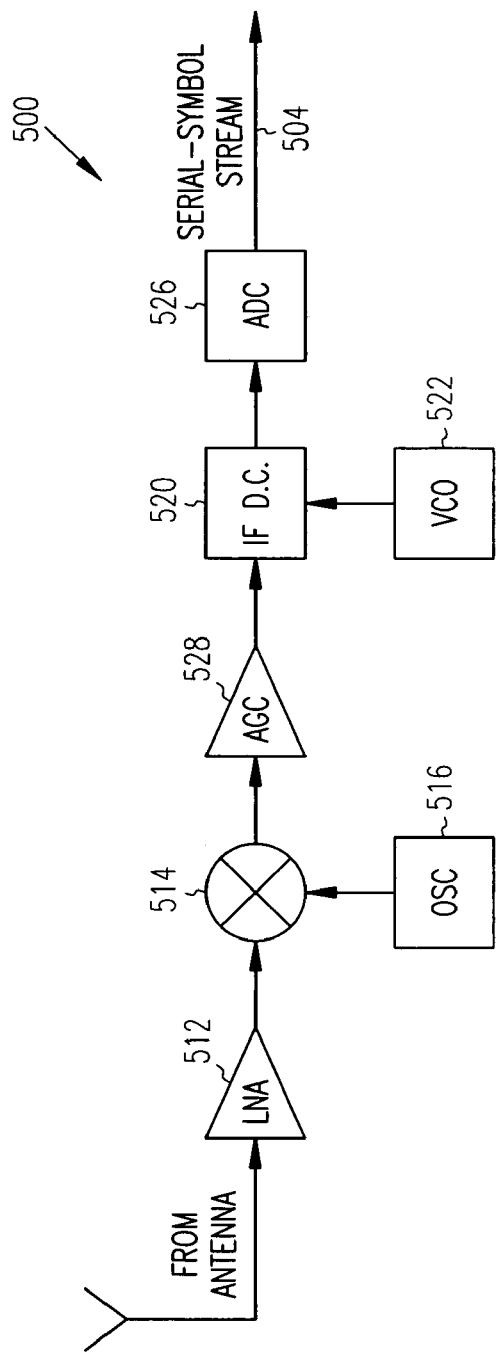
FIG. 5 is a block diagram of RF-receive circuitry in accordance with some embodiments of the present invention.

FIG. 5 is a block diagram of RF-receive circuitry in accordance with some embodiments of the present invention. RF-receive circuitry 500 may be suitable for use as RF-receive circuitry 102 (FIG. 1) although other circuitry may also be suitable. RF-receive circuitry 500 may perform a two-stage downconversion, although this is not a requirement. RF-receive circuitry 500 may include low-noise amplifier (LNA) 512 and RF downconverter 514. RF downconverter 514 may generate an intermediate frequency (IF) signal using signals from oscillator 516. Oscillator 516 may be a fixed-frequency heterodyne oscillator. Automatic gain control (AGC) element 518 may adjust a power level for IF down converter 520. IF down converter 520 may generate baseband signals, and in some embodiments, may function as a detector to generate in-phase (I) signals and quadrature phase (Q) signals at substantially zero frequency using a frequency controllable device such as voltage-controlled oscillator (VCO) 522. In one embodiment, VCO 522 may be set upon detection of a wideband OFDM packet and may remain constant for the duration of the wideband OFDM packet. The in-phase (I) signals and quadrature phase (Q) signals, provided by IF down converter 520, may be sampled and converted to a digital bit stream by analog to digital converter (ADC) 526 to provide serial symbol stream 504.

In accordance with some embodiments of the present invention, RF-receive circuitry 500 may generate serial symbol stream 504 from one or more received subchannels that comprise a wideband channel. In these embodiments, RF-receive circuitry 500 may generate a single time-division multiplexed serial symbol stream (i.e., serial symbol stream 504) which may be provided to matched filters 206 (FIG. 2). This single time-division multiplexed serial symbol stream may include a serial symbol stream from more than one of the subchannels. In these embodiments LNA 512 and RF downconverter 514 may operate over up to four of more of the subchannels.

In accordance with other embodiments of the present invention, RF-receive circuitry 500 may comprise separate elements for each of the subchannels to generate parallel sets of serial symbol streams (e.g., one for each received subchannel). For example, more than one ADC 526, among other things, may be included as part of circuitry 500. In these embodiments, the individual serial symbol streams may be provided separately to each of matched filters 206 (FIG. 2).

Figure 6:
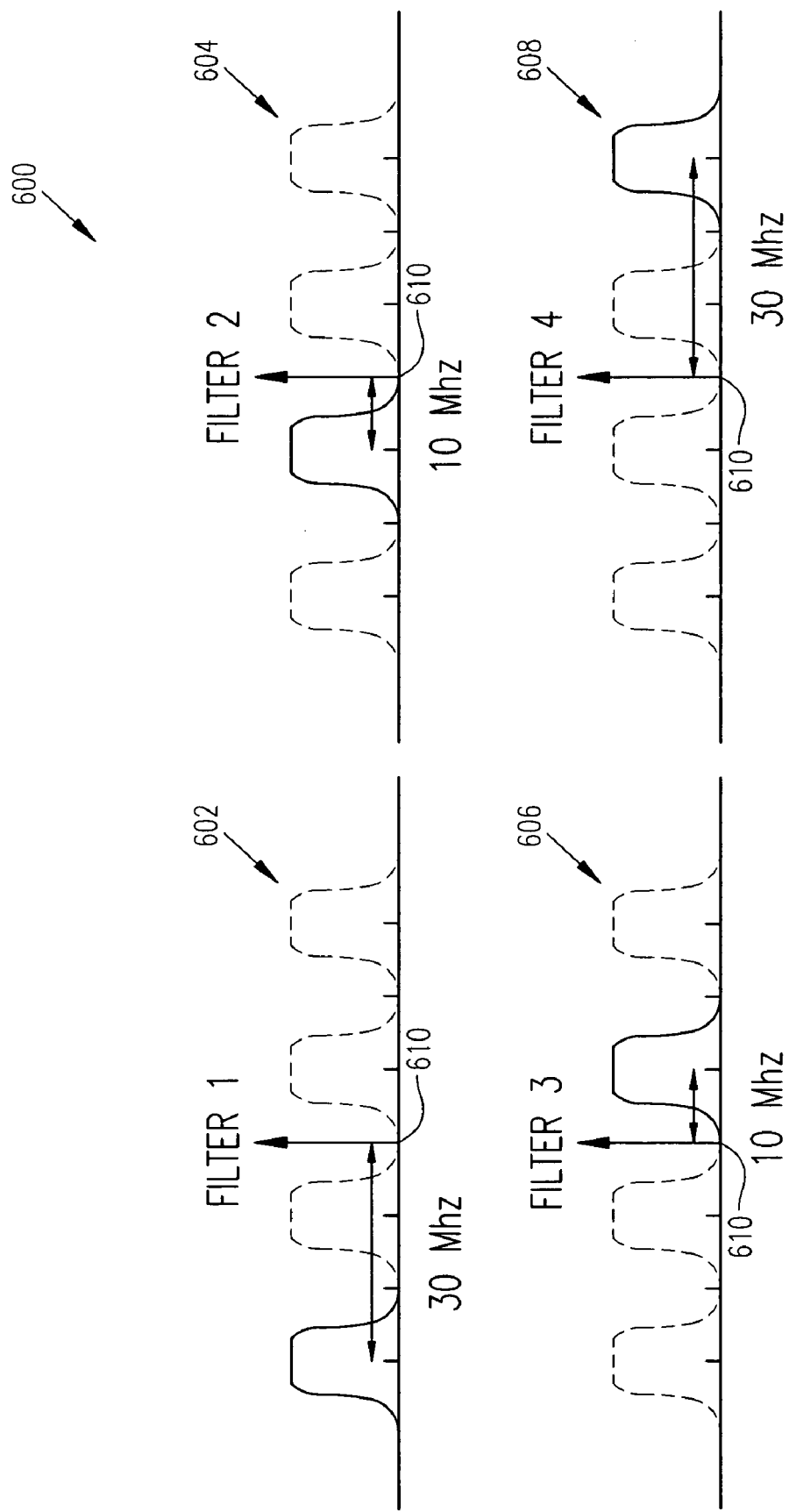
FIG. 6 illustrates matched-filter coefficient spectra in accordance with some embodiments of the present invention.
Figure 7A:
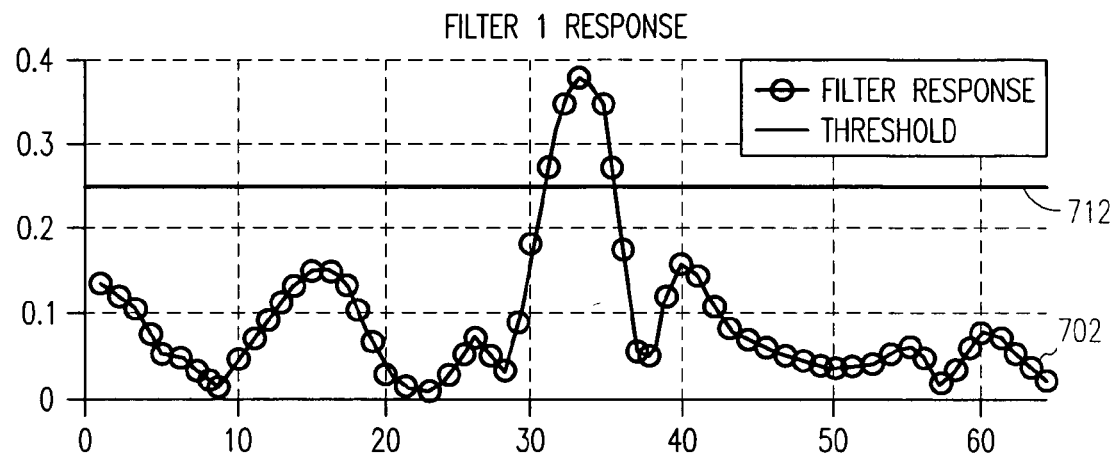
FIGS. 7A, 7B, 7C and 7D illustrates filter response of matched filters in accordance with some embodiments of the present invention.
Figure 7B:
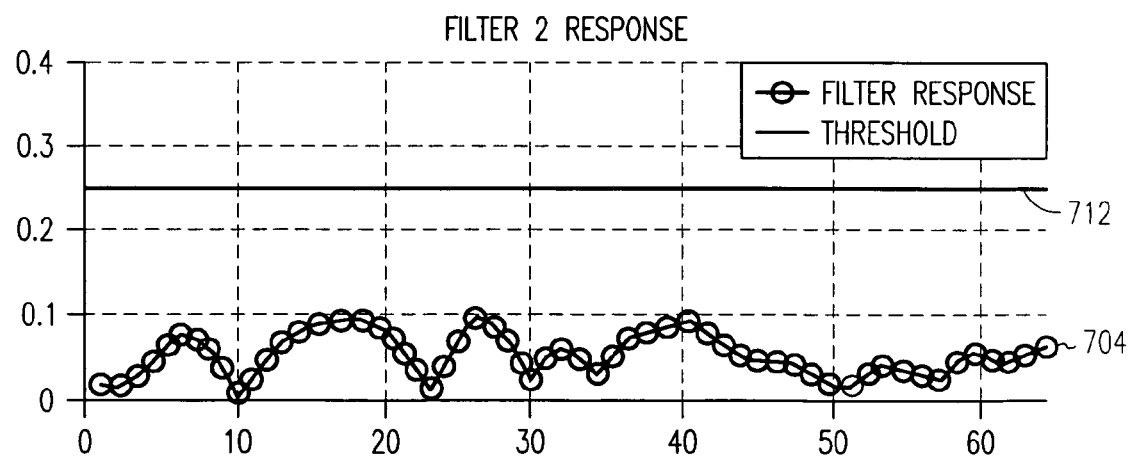
Figure 7C:
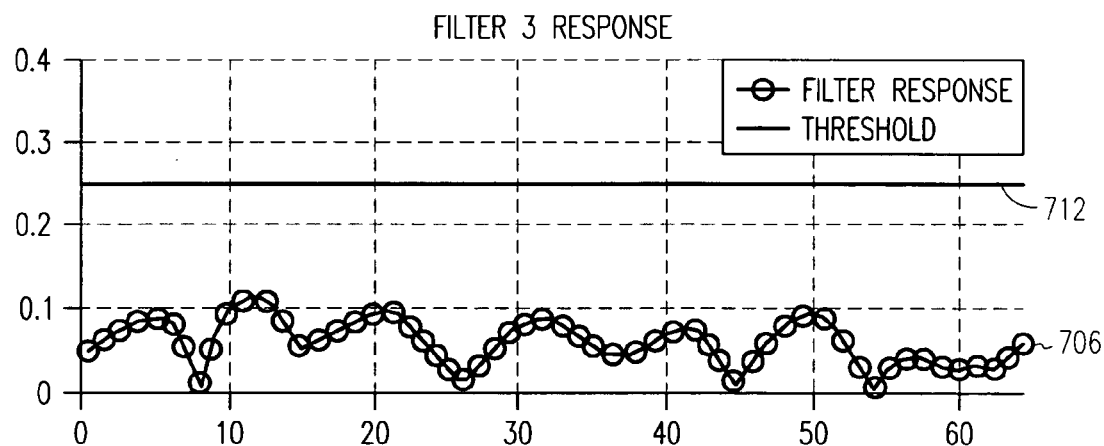
Figure 7D:
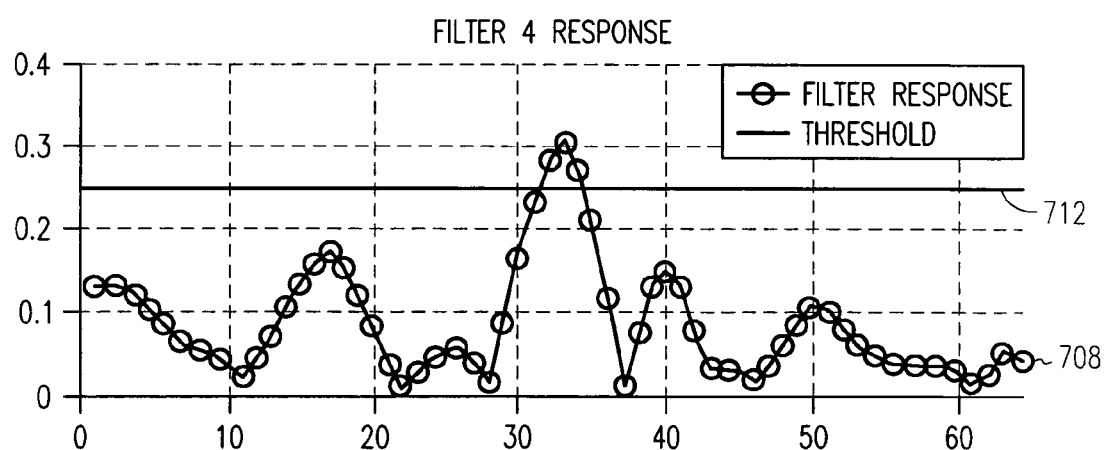

FIG. 6 illustrates matched-filter coefficient spectra in accordance with some embodiments of the present invention. Coefficient spectra 600 illustrate coefficient spectra of four matched filters which may be suitable in some embodiments which detect up to four subchannels in parallel. Embodiments of the present invention are equally suitable with the use of less than four or more than four matched filters. Furthermore, coefficient spectra 600 are illustrated for subchannels having a 20 MHz bandwidth, although the scope of the invention is not limited in this respect. In some embodiments, the matched filters may have identical or substantially identical coefficients, but may have their center frequencies shifted depending on the location of the subchannels.

Coefficient spectrum 602 illustrates a coefficient spectrum for a matched filter having its center frequency offset by negative 30 MHz from wideband-channel center frequency 610. Coefficient spectrum 602 may represent a coefficient spectrum of a first of a plurality of matched filters, such as a first one of matched filters 206 (FIG. 2). Coefficient spectrum 604 illustrates a coefficient spectrum for a matched filter having its center frequency offset by negative 10 MHz from wideband-channel center frequency 610. Coefficient spectrum 604 may represent a coefficient spectrum of a second of a plurality of matched filters, such as a second one of matched filters 206 (FIG. 2). Coefficient spectrum 606 illustrates a coefficient spectrum for a matched filter having its center frequency offset by positive 10 MHz from wideband-channel center frequency 610. Coefficient spectrum 606 may represent a coefficient spectrum of a third of a plurality of matched filters, such as a third one of matched filters 206 (FIG. 2). Coefficient spectrum 610 illustrates a coefficient spectrum for a matched filter having its center frequency offset by positive 30 MHz from wideband-channel center frequency 610. Coefficient spectrum 610 may represent a coefficient spectrum of a fourth of a plurality of matched filters, such as a fourth one of matched filters 206 (FIG. 2).

FIGS. 7A, 7B, 7C and 7D illustrate filter responses of matched filters in accordance with some embodiments of the present invention. Filter responses 702 through 708 may illustrate the filter responses over time for four matched filters, such as filters 206 (FIG. 2), when used as part of circuitry 200 (FIG. 2) for generating a channelization vector, such as channelization vector 208 (FIG. 2). FIGS. 7A, 7B, 7C and 7D illustrate the generation of channelization vector "1001". Filter response 702 (FIG. 7A) of a first matched filter is illustrated as exceeded threshold 712 which may provide a "1" in the first position of the channelization vector. Filter response 704 (FIG. 7B) is illustrated as not exceeding threshold 712 which may provide a "0" in the second position of the channelization vector. Filter response 706 (FIG. 7C) is illustrated as not exceeding threshold 712 which may provide a "0" in the third position of the channelization vector. Filter response 708 (FIG. 7D) is illustrated as exceeding threshold 712 which may provide a "1" in the fourth position of the channelization vector. The generation of channelization vector "1001" may indicate that the first and fourth subchannels are active and that the second and third subchannels are inactive.

Figure 8:
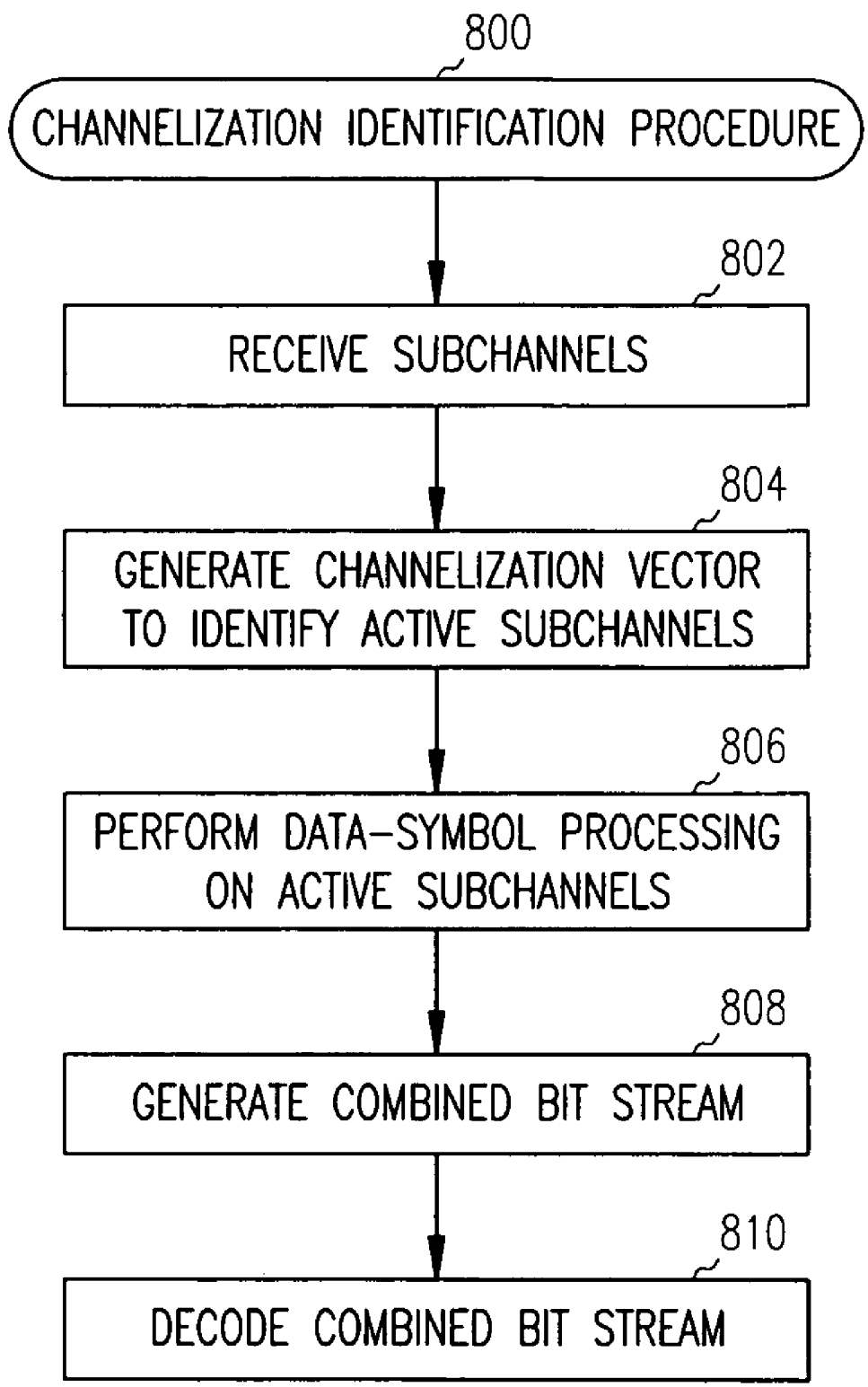
FIG. 8 is a flow chart of a channelization-identification procedure in accordance with some embodiments of the present invention.

FIG. 8 is a flow chart of a channelization-identification procedure in accordance with embodiments of the present invention. Procedure 800 may be used as part of wideband receiver which receives symbol-modulated communications over a wideband channel that may be adaptively changed by a transmitting station. In some embodiments, procedure 800 may be performed by a wideband receiver system, such as receiver system 100 (FIG. 1), although other receivers may also be suitable for performing procedure 800. Although the individual operations of procedure 800 are illustrated and described as separate operations, one or more of the individual operations may be performed concurrently and nothing requires that the operations be performed in the order illustrated.

Operation 802 receives subchannels of a plurality of subchannels that may comprise a wideband channel. Operation 802 may include receiving synchronized sequences of training symbols (such as short-OFDM training symbols)

over more than one subchannel, although the scope of the invention is not limited in this respect. Operation 802 may generate a serial symbol stream, such as serial symbol stream 104 (FIG. 1), and, in some embodiments, operation 802 may generate a sampled short-training sequence such as sampled short-training sequence 204 (FIG. 2). In some embodiments, operation 802 may be performed by RF-receive circuitry 102 (FIG. 1), although the scope of the invention is not limited in this respect.

Operation 804 generates a channelization vector from the serial symbol stream. The channelization vector may indicate which of the subchannels are active and which are inactive. Operation 804 may generate the channelization vector using a matched coefficient spectrum for the subchannels. In some embodiments, operation 804 may be performed by short-training symbol processing circuitry 106 (FIG. 1), although the scope of the invention is not limited in this respect.

Operation 806 may perform data-symbol processing on the active subchannels. In some embodiments, operation 806 may actively refrain from performing data-symbol processing on the inactive subchannels by switching-off the processing circuitry, such as FFT circuitry, for the inactive channels. In some embodiments, operation 806 may be performed by data-symbol processing circuitry 110 (FIG. 1) in response to the channelization vector, although the scope of the invention is not limited in this respect.

Operation 808 generates a combined bit stream representing contributions from the active subchannels, and operation 810 decodes the combined bit stream to generate a decoded bit stream, such as decoded bit stream 112 (FIG. 1). In some embodiments, operations 808 and 810 may be performed by data-symbol processing circuitry 110 (FIG. 1), although the scope of the invention is not limited in this respect.

In some embodiments, operations 802 through 804 may be performed using the sequence of short-training symbols of the preamble of an OFDM packet, and operation 806 through 810 may be performed using the long-training symbols and data symbols of the OFDM packet. In some embodiments, operations 802 through 810 may be repeated for each subsequently received packet.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier wave, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method comprising:
    detecting a plurality of orthogonal frequency division multiplexed (OFDM) subchannels comprising symbol-modulated subcarriers to generate a channelization vector indicating which of the subchannels are active and which of the subchannels are inactive;
    performing data-symbol processing on the active subchannels in response to the channelization vector to generate a bit stream from the active subchannels; and
    refraining from performing data-symbol processing on the inactive of the subchannels in response to the channelization vector,
    wherein each inactive sub-channel comprises a group of adjacent inactive OFDM sub-carriers.

2. The method of claim 1 wherein the plurality of subchannels comprises a wideband channel, and wherein the method further comprises:
    generating a bit stream for each active subchannel by demapping symbols of the subcarriers of the active subchannel; and
    generating a decoded bit stream for the wideband channel by multiplexing the bit streams of the active subchannels.

3. The method of claim 1 wherein detecting comprises independently detecting the subchannels of the plurality with a parallel set of matched filters.

4. The method of claim 1 wherein detecting comprises detecting the subchannels with a parallel set of matched filters, wherein each of the matched filters has a coefficient spectrum matched to a corresponding one of the subchannels.

5. The method of claim 1 further comprising providing the channelization vector to data-symbol processing circuitry,
    wherein the data-symbol processing circuitry is responsive to the channelization vector to perform data-symbol processing on the active subchannels, and
    wherein the data-symbol processing circuitry is responsive to the channelization vector to turn-off data-symbol processing on the inactive subchannels.

6. The method of claim 5 wherein the performing data-symbol processing comprises performing a fast-Fourier transform on only the active subchannels to generate a bit stream from combined contributions of the active subchannels.

7. The method of claim 1 further comprising:
    providing the channelization vector to combiner circuitry; and combining, with the combiner circuitry, bit streams from the data-symbol processing of the active subchannels to generate a combined bit stream.

8. The method of claim 7 further comprising refraining from combining a processing output generated from the inactive subchannels.

9. The method of claim 1 further comprising:
generating a channelization vector for a plurality of received packets; and
repeating the detecting and performing the data-symbol processing for the received packets, wherein the received packets comprise symbols modulated on a plurality of orthogonal subcarriers of an orthogonal frequency-division multiplexed signal, wherein each subcarrier of a subchannel carries different information symbols.

10. The method of claim 1 further comprising receiving a synchronized sequence of short-training symbols on at least two of the active subchannels, the sequence of short-training symbols comprising at least a portion of preamble of a received packet,
wherein the detecting comprises sampling the sequence of short-training symbols on the at least two active subchannels, and
wherein the data-symbol processing comprises data-symbol processing a sequence of long-training symbols and data symbols on the active subchannels, the long-training symbols and data symbols following the sequence of short-training symbols in the packet.

11. The method of claim 1 further comprising receiving synchronized data streams on the active subchannels, the synchronized data streams being preceded by a preamble, the channelization vector being generated from detection of the preamble.

12. The method of claim 1 further comprising:
determining channel conditions of the subchannels, the channel conditions including at least one of an interference level and fading; and
sending a request to a transmitter to refrain from transmitting on a subchannel that has poor channel conditions.

13. An apparatus comprising:
short-training symbol processing circuitry to detect a training sequence modulated on a plurality of orthogonal frequency division multiplexed (OFDM) subchannels and generate a channelization vector indicating which of the subchannels are active and which of the subchannels are inactive; and
data-symbol processing circuitry to process data symbols on the active subchannels in response to the channelization vectors,
wherein the data-symbol processing circuitry refrains from processing the inactive of the subchannels in response to the channelization vector, and
wherein each inactive sub-channel comprises a group of adjacent inactive OFDM sub-carriers.

14. The apparatus of claim 13 wherein the plurality of subchannels comprises a wideband channel, and
wherein the data-symbol processing circuitry generates a bit stream for each active subchannel by demapping symbols of the subcarriers of the active subchannel and generates a decoded bit stream for the wideband channel by multiplexing the bit streams of the active subchannels.

15. The apparatus of claim 13 wherein the short-training symbol processing circuitry comprises a plurality of matched filters, each matched filter having a coefficient spectrum matched to a corresponding one of the subchannels.

16. The apparatus of claim 15 wherein the short-training symbol processing circuitry further comprises:
non-coherent summators to sum output from a corresponding one of the matched filters;
threshold detectors to determine when the summed output from a corresponding one of the summators exceeds a predetermined threshold; and
a multiplexer to combine outputs from the threshold detectors to generate the channelization vector.

17. The apparatus of claim 13 wherein the data-symbol processing circuitry comprises a combiner to generate a combined bit stream from individual bit streams generated by data-symbol processing the active subchannels in response to channelization vector, the combiner to refrain from combining contributions from the inactive subchannels in response to the channelization vector.

18. The apparatus of claim 13 wherein the data-symbol processing circuitry comprises fast-Fourier transform (FFT) circuitry for a predetermined number of the subchannels, channel equalization circuitry, demapping circuitry and deinterleaving circuitry to perform data-symbol processing in parallel for the predetermined number of the subchannels.

19. The apparatus of claim 18 wherein the data-symbol processing circuitry further comprises:
a combiner to a combiner to generate a combined bit stream from individual bit streams generated by data-symbol processing the active subchannels in response to channelization vector; and
a decoder to decode the combined bit stream and generate a decoded bit stream output.

20. The apparatus of claim 18 wherein the data-symbol processing circuitry comprises four 64-bit fast-Fourier transform (FFT) processing circuits to process four 20 MHz subchannels substantially in parallel.

21. The apparatus of claim 13 wherein the data-symbol processing circuitry comprises wideband fast-Fourier transform (FFT) circuitry to selectively perform an FFT on parallel groups of time-domain samples from the active subchannels in response to the channelization vector and to selectively refrain from performing the FFT on the parallel groups of time-domain samples from the inactive subchannels in further response to the channelization vector.

22. The apparatus of claim 21 wherein the wideband fast-Fourier transform (FFT) circuitry comprises a 256-bit FFT processing circuit to process 256 parallel symbols from a wideband channel comprised of up to four 20 MHz subchannels.

23. The apparatus of claim 18 further comprising a wideband decoder to generate a decoded bit stream from combined bit streams from the active subchannels.

24. A receiver system comprising:
an omnidirectional antenna to receive symbol-modulated subcarriers over a plurality of orthogonal frequency division multiplexed (OFDM) subchannels;
short-training symbol processing circuitry to detect the plurality of subchannels and generate a channelization vector indicating which of the subchannels are active and which of the subchannels are inactive; and
data-symbol processing circuitry to process data symbols on the active subchannels in response to the channelization vector,
wherein the data-symbol processing circuitry refrains from processing the inactive of the subchannels in response to the channelization vector, and
wherein each inactive sub-channel comprises a group of adjacent inactive OFDM sub-carriers.

25. A receiver system comprising:
an omnidirectional antenna to receive symbol-modulated subcarriers over a plurality of subchannels;
short-training symbol processing circuitry to detect the plurality of subchannels and generate a channelization vector indicating which of the subchannels are active and which of the subchannels are inactive; and
data-symbol processing circuitry to process data symbols on the active subchannels in response to the channelization vector,
wherein the short-training symbol processing circuitry comprises:
a plurality of matched filters, each matched filter having a coefficient spectrum matched to a corresponding one of the subchannels;
non-coherent summators to sum output from a corresponding one of the matched filters;
threshold detectors to determine when the summed output from a corresponding one of the summators exceeds a predetermined threshold; and
a multiplexer to combine outputs from the threshold detectors to generate the channelization vector.

26. The system of claim 24 wherein the data-symbol processing circuitry comprises fast-Fourier transform (FFT) circuitry for a predetermined number of the subchannels, channel equalization circuitry, demapping circuitry and deinterleaving circuitry to perform data-symbol processing in parallel for the predetermined number of the subchannels.

27. An article of manufacture comprising a computer readable storage medium that provides instructions, which when executed by one or more processors, cause said processors to perform operations comprising:

detecting a plurality of orthogonal frequency division multiplexed (OFDM) subchannels to generate a channelization vector indicating which of the subchannels are active and which of the subchannels are inactive;
performing data-symbol processing on the active of the subchannels in response to the channelization vector, and
refraining from performing data-symbol processing on the inactive of the subchannels in response to the channelization vector,
wherein each inactive sub-channel comprises a group of adjacent inactive OFDM sub-carriers.

28. The article of manufacture of claim 27 wherein the plurality of subchannels comprises a wideband channel,
wherein the instructions, when further executed by one or more of said processors, cause said processors to perform operations further comprise generating a decoded bit stream from for the wideband channel by multiplexing the bit streams of the active subchannels, and
wherein detecting comprises detecting the subchannels with instructions that implement a parallel set of matched filters, wherein each of the matched filters has a coefficient spectrum matched to a corresponding one of the subchannels.

29. The article of manufacture of claim 27 wherein the instructions, when further executed by one or more of said processors, cause said processors to perform operations further comprising performing a fast-Fourier transform to generate a bit stream from the active subchannels.

* * * * *

UNITED STATES PATENT AND TRADEMARK OFFICE
CERTIFICATE OF CORRECTION

PATENT NO. : 7,286,606 B2 Page 1 of 1
APPLICATION NO. : 10/728476
DATED : October 23, 2007
INVENTOR(S) : Maltsev et al.

It is certified that error appears in the above-identified patent and that said Letters Patent is hereby corrected as shown below:

On the Title page, item (56), under "U.S. Patent Documents", in column 1, line 2, delete "Thompson et al." and insert -- Thomson et al. --, therefor.

In column 11, line 50, in Claim 13, delete "vectors," and insert -- vector, --, therefor.

In column 14, line 6, in Claim 27, after "vector" delete "," and insert -- ; --, therefor.

Signed and Sealed this

First Day of April, 2008

JON W. DUDAS
*Director of the United States Patent and Trademark Office*